US008495207B2

(12) United States Patent
Lee

(10) Patent No.: US 8,495,207 B2
(45) Date of Patent: Jul. 23, 2013

(54) NETWORK SYSTEM FOR POLICING RESOURCE INTENSIVE BEHAVIORS

(75) Inventor: Jay J. Lee, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 196 days.

(21) Appl. No.: 12/974,364

(22) Filed: Dec. 21, 2010

(65) Prior Publication Data
US 2012/0158949 A1    Jun. 21, 2012

(51) Int. Cl.
*G06F 15/16*    (2006.01)
(52) U.S. Cl.
USPC ............ 709/224; 709/203; 709/228; 370/241
(58) Field of Classification Search
USPC ................................. 709/203, 220, 226, 228
See application file for complete search history.

(56) References Cited

U.S. PATENT DOCUMENTS

| 7,433,943 | B1* | 10/2008 | Ford .............................. 709/223 |
| 2010/0020516 | A1* | 1/2010 | Kishino et al. ................ 361/803 |
| 2010/0268763 | A1* | 10/2010 | Rasanen ....................... 709/203 |
| 2012/0158872 | A1* | 6/2012 | McNamee et al. ............ 709/206 |

* cited by examiner

*Primary Examiner* — Khanh Dinh

(57) ABSTRACT

A system may include a network traffic policing system configured to monitor resource intensive users and applications of a wireless communication network. The network traffic policing system may include a processing device configured to determine policy actions; and a plurality of policy nodes in communication with the processing device and configured to: gather statistics regarding key variables of the wireless communication network, the statistics including at least one non-data usage variable, forward updated information relating to the key variables to the processing device, and enforce at least one policy action determined by the processing device.

18 Claims, 7 Drawing Sheets

NETWORK SYSTEM FOR POLICING RESOURCE INTENSIVE BEHAVIORS

BACKGROUND

Some users of network resources consistently use a large amount of network bandwidth. Experience has shown that a few such users can congest a network and facilitate a potential network outage. Some applications may also use a large amount of network bandwidth, also causing network congestion. Exemplary high-bandwidth applications may include high-definition (HD) video, frequent large file transfer (FTP), and graphical cloud computing applications.

Traffic policing is a process of monitoring network traffic for compliance with a traffic contract, and taking steps to enforce that contract. One type of a traffic contract may be referred to as a service level agreement (SLA). Traffic policing functionality may be implemented in various ways in communications networks, and in particular token bucket algorithms are widely used. A token bucket algorithm measures the data usage of a user or application, and compares whether the measured data usage is within a level of network resource usage agreed to in the traffic contract or SLA.

DETAILED DESCRIPTION

Figure 1:
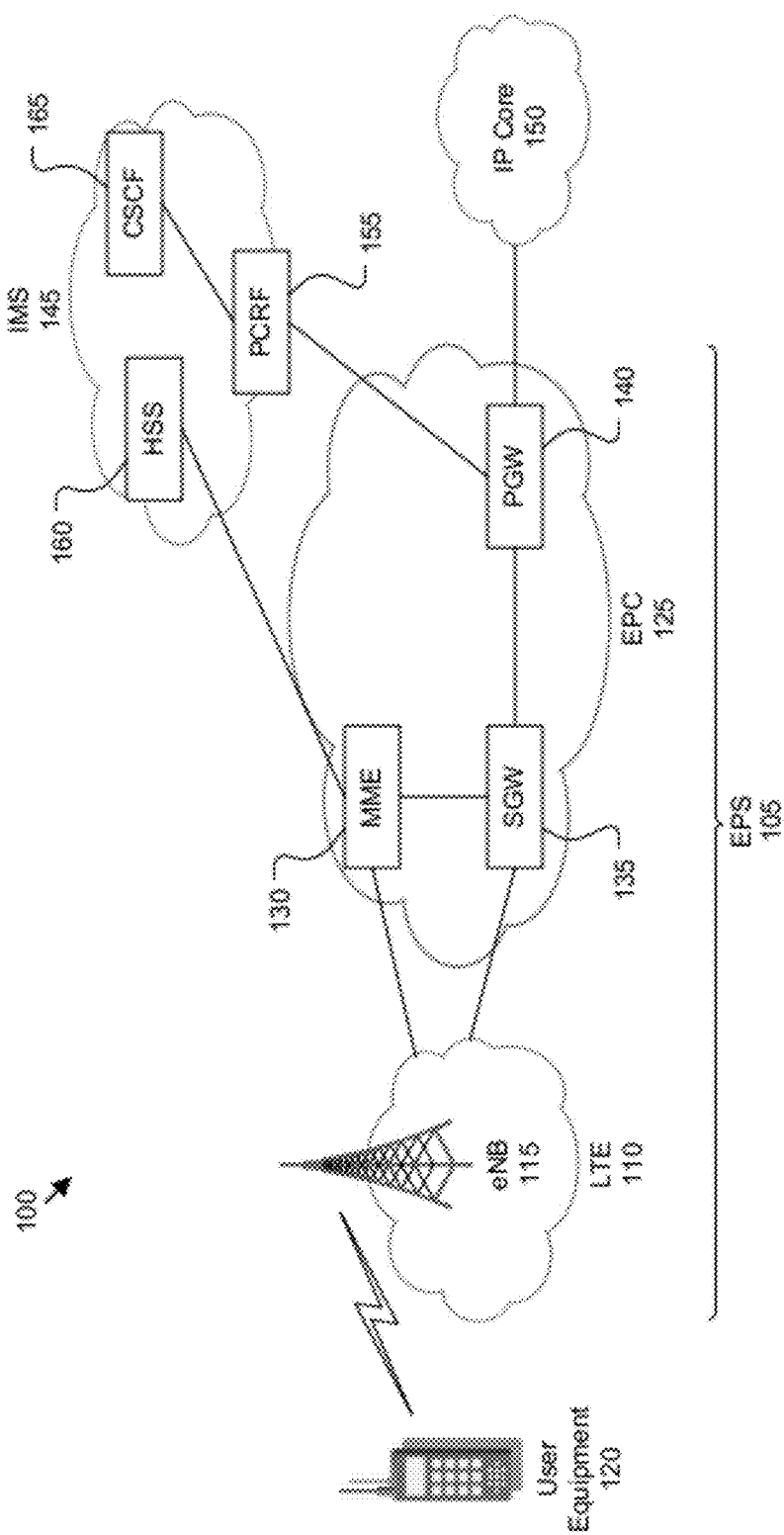
FIG. 1 illustrates an exemplary evolved packet system architecture in a wireless network.

In today's wireless networks, a principal concern has been how to optimize the use of scarce radio resources to support new emerging applications. As the next generation wireless networks, such as long term evolution (LTE) networks, are being deployed, the concern has become even more critical. Both wired and wireless networks may become congested in many situations, thereby causing problems for carriers such as service degradation, network outage, and low network utilization.

A few high-bandwidth users or applications can congest a network and potentially facilitate a network outage. However, in wireless networks, faulty applications and malfunctioned devices can cause significant congestion in radio networks, even without generating a large amount of data traffic. While token bucket algorithms provide a form of traffic policing in the network, such algorithms may be ineffective in diagnosing network issues requiring more than simply checking data usage to determine the presence of networking issues.

As an example, new emerging applications, such as instant messaging, presence services, and social networking can cause significant radio resource utilization problems for wireless operators. Network users may activate these applications and stay connected, thus occupying scarce radio channels for an extended session. While connected, these applications typically send small number of packets over the dedicated radio connection, with long periods of inactivity in-between. Since the number of packets or the amount of traffic sent over the radio connection is very small, the network utilization is quite low. For wireless network operators, air interfaces of a radio network are among the scarcest of network resources, and the number of connections available on the air interface is limited. Thus, it may be expensive for users or applications to use scarce radio connections for such low traffic load and lengthy sessions, preventing their use by other users or applications.

In addition to low throughput applications, faulty applications and malfunctioned user devices that continuously attempt to attach to the network (or that constantly attach and release) may also cause significant resource utilization problems for the radio access network. Such applications and devices may consume large amounts of air interface resources, without providing any real benefit to the users.

A network traffic policing system (NTPS) may be implemented that monitors key traffic characteristics and provides the network with the tools to check if a user, application, or traffic flow is network compliant. The NTPS may measure key parameters on the network in addition to data usage, and may compare the key parameters against key parameters thresholds values. If a particular user, application, or traffic flows violates an applicable key parameter threshold, the NTPS may determine and enforce an appropriate policy action. Policy actions may include to drop, delay, or downgrade a user, application, or traffic flow, or various combinations of these actions.

A hierarchical NTPS may be implemented utilizing existing network nodes hardware, thereby allowing for the NTPS to be implemented without requiring substantial hardware changes to the underlying networks. Accordingly, by using an NTPS, service providers and operators may efficiently implement policy actions to suit their developing needs and service level requirements.

Fourth Generation (4G) wireless networks, as defined by the 3rd Generation Partnership Project (3GPP) standardization, are used herein to facilitate explanation of the NTPS. Nevertheless, the disclosed examples are intended to be illustrative, not limiting, and the NTPS may be applied to other types of packet-switched and/or wireless networks.

FIG. 1 illustrates an exemplary system 100 including an evolved packet system (EPS) 105 architecture in a wireless network. The system 100 may further include a long term evolution (LTE) network 110 having one or more eNB nodes 115. The one or more eNB nodes 115 may be in communication with user equipment 120 and an evolved packet core (EPC) 125. The EPC 125 may include a mobility management entity (MME) 130, a serving gateway (SGW) 135, a packet data network (PDN) gateway (PGW) 140, and may be in communication with an IP multimedia subsystem (IMS) 145 and an IP core 150. The IMS 145 may include a policy and charging rule function (PCRF) 155, a home subscriber server (HSS) 160, and a call session control function (CSCF) 165. System 100 may take many different forms and include multiple and/or alternate components and facilities. While an exemplary system 100 is shown in FIG. 1, the exemplary components illustrated in the Figure are not intended to be limiting. Indeed, additional or alternative components and/or implementations may be used.

LTE 110 is a growing standard in the mobile network technology, including enhancements over earlier global system for mobile communications (GSM), enhanced data for global evolution (EDGE) and universal mobile telecommunications system (UTMS) network technologies. An LTE 110 network may provide downlink peak rates of 105 Mbit/s, uplink rates of 50 Mbit/s and radio access network (RAN) round-trip times on the order of 10 milliseconds. The LTE 110 may include one or more nodes 115, such as the illustrated eNode B (eNB) node 115, which combine the functionality of both base station and radio access controllers (RNC) of 2G or 3G radio access networks. The eNB nodes 115 may accordingly support the LTE 110 air interface and may include functions for radio resource control, user plane ciphering and packet data convergence protocol (PDCP).

The eNB nodes 115 of the LTE 110 may provide communications services to one or more pieces of user equipment 120. User equipment 120 (sometimes referred to as UE 120) may include any a device or devices configured to be operated by one or more users, such as a cellular telephone, laptop computer, tablet computing device, or personal digital assistant, among other exemplary devices. In addition to network functionality, user equipment 120 may include one or more components capable of receiving input such as voice and data entry from a user, and providing output to the user such as audible and/or visual output.

A portion of the LTE 110 standard specifies the inclusion of a flat IP-based network architecture designed to replace the general packet radio service (GPRS) core network often used for 2G and 3G cellular communication systems. Accordingly, the EPC 125 may be an IP network and may be substantially packet-switched. Services such as voice which are traditionally circuit-switched, may accordingly be provided as packet-switched communications over the EPC 125.

As mentioned above, the EPC 125 may include a MME 130, a SGW 135, and a PGW 140. The MME 130 may be configured to manage mobility information, UE 120 identities, and security parameters. The SGW 135 may be configured to operate as a gateway between the EPC 125 and the LTE 110. The PGW 140 may be configured to operate as the gateway between the EPC 125 and a packet data network (PDN), i.e., the IP core 150.

The MME 130 may further be configured to perform control-plane functionality, as compared to the SGW 135 and PGW 140 which may be configured to perform bearer-plane functionality. Control-plane functionality includes protocols and communications paths used to configure the network to meet user demand for data services, such as the establishment of connections, the control of attributes, the routing or re-routing of established connections, and the assignment and reassignment of resources to user equipment 120. Bearer-place functionality includes protocols and communications paths configured to transmit the requested data services, such as to transmit Voice over Internet Protocol (VoIP) and/or video session data. The split in responsibility allows for independent scaling and growth of throughput traffic as compared to the scaling and growth of the control signal processing. It also allows operators to choose optimized topological locations of MME 130, SGW 135, PGW 140 elements within the EPC 125 in order to optimize the network in different aspects, such as to reduce network latency.

The EPC 125 may utilize an IP Multimedia Subsystem (IMS) 145 network to facilitate packet-switched voice communications. An exemplary IMS 145 architecture is shown in FIG. 1. While other protocols are possible, the session initiation protocol (SIP) has been accepted as a 3GPP signaling protocol for use by the IMS 145 for IP-based streaming multimedia services wireless networks.

The HSS 160 may be a database configured to store user information and user profiles. The MME 130 of the EPC 125 may be in communication with the HSS 160 and may accordingly facilitate SIP calling functionality.

The CSCF 165 is may be a central node in the IMS 145, and may be implemented as a SIP server configured to processes SIP signaling in the IMS 145. Four exemplary types of CSCFs 165 are as follows: Proxy CSCF 165 (P-CSCF); Serving CSCF 165 (S-CSCF); Interrogating CSCF 165 (I-CSCF); and Emergency CSCF 165 (E-CSCF).

The P-CSCF 165 may be a first point of contact between an IMS-based user terminal and the IMS 145 network. The P-CSCF 165 may be configured to function as an outbound/inbound SIP proxy server, where the requests initiated by the user terminals will traverse to the P-CSCF 165.

The S-CSCF 165 may be configured to operate as the central node of the signaling plane. Accordingly, the S-CSCF 165 may be a SIP server, but may also perform session control.

The I-CSCF 165 may be another SIP proxy located at the edge of an administrative domain. An IP address of the I-CSCF 165 may be published in a domain name system (DNS) record, such that remote servers may be able to locate the I-CSCF 165 via DNS and use the I-CSCF 165 as a forwarding point for SIP packets to the domain of the I-CSCF 165. In addition to SIP proxy functionality, the I-CSCF 165 may further be configured to have an interface to the HSS 160 to retrieve user information and routes the SIP request to the appropriate destination (e.g., S-CSCF 165).

The E-CSCF 165 may be configured to route emergency calls (e.g., 911 calls) to appropriate destinations.

In addition to the CSCF 165 and the HSS 160, the IMS 145 may contain one or more adjunct nodes. These adjunct nodes may include a policy and charging control function (PCRF) 155 discussed in detail with respect to FIG. 2, as well as a subscription profile repository (SPR), and various application servers (AS), such as SIP application servers, instant messaging application servers, and presence application servers.

Figure 2:
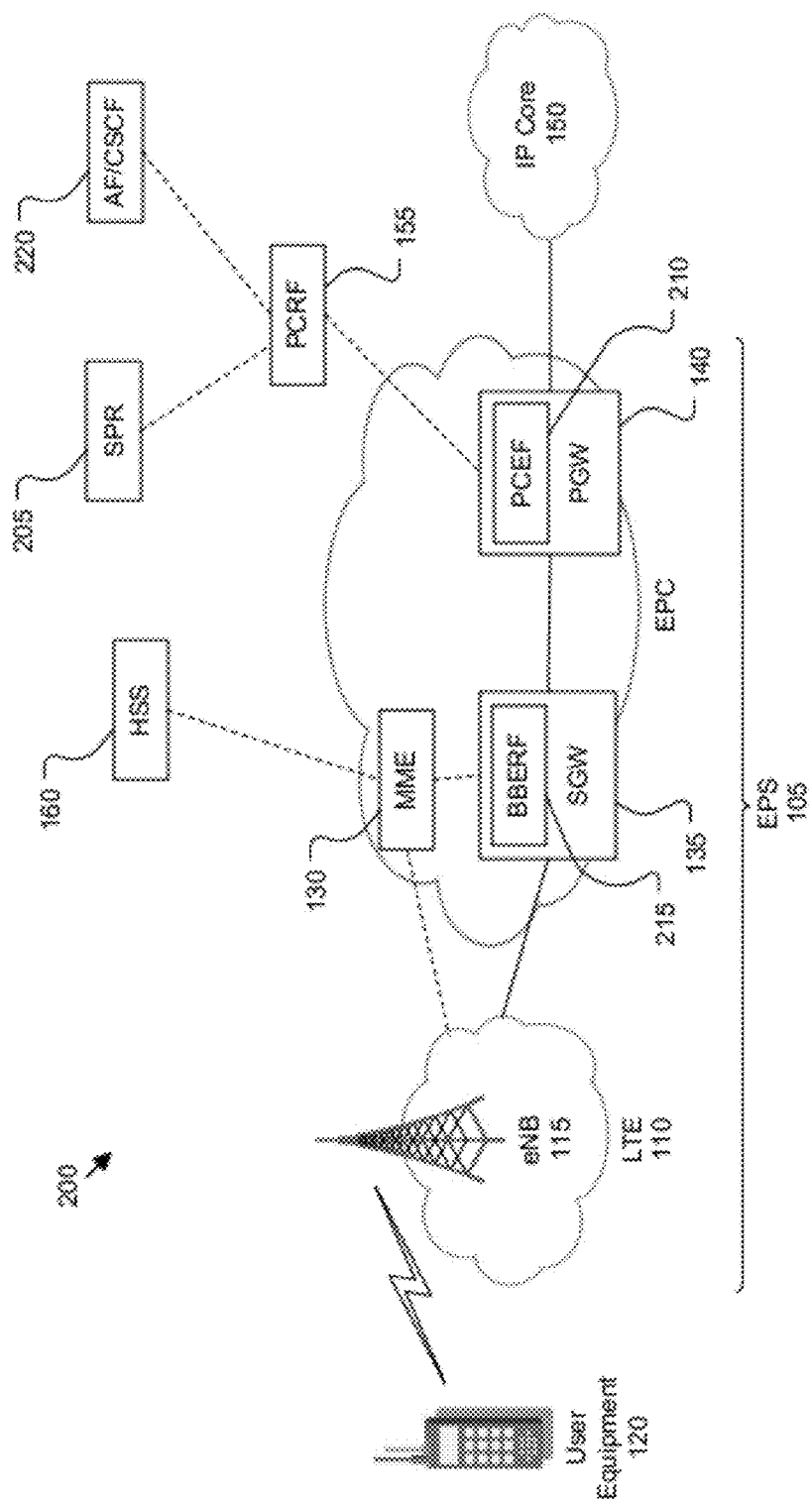
FIG. 2 illustrates an exemplary policy and charging architecture in a wireless network.

FIG. 2 illustrates a reference policy and charging (PCC) architecture 200 in a wireless network. The PCC architecture 200 may be configured to enable operators to provide quality of service (QoS) to subscribers for IP-based services. The PCC architecture 200 may further be configured to charge for the resources provided based on the user's subscription information and other policy information. IP QoS may include various aspects of traffic management, such as: priority classification, scheduling, queuing management, admission control, traffic policing and traffic shaping. Traffic policing decisions may accordingly be made by the policy and charging function (PCRF) 155 of the PCC architecture 200. Exemplary network elements and interfaces of the PCC architecture 200 are illustrated in FIG. 2, including a subscription profile repository (SPR) 205, a policy and charging enforcement function (PCEF) 210, a bearer binding and event reporting function (BBERF) 215, and an application function (AF) 220.

The SPR 205 may be configured to store and retrieve QoS and charging subscription policies associated with user equipment 120 connected to the network. While illustrated as being separate, in some examples the SPR 205 may be integrated with the HSS 160 in some deployments.

The PCRF 155 may operate as the policy engine of the PCC architecture 200. The PCRF 155 may accordingly make policy decisions for the user equipment 120 upon request. The PCRF 155 may further provide charging and QoS rules to the PCEF 210, and QoS rules to the BBERF 215 for enforcement. The charging rules may include information configured to identify flows along with charging rates. The QoS rules may include information configured to identify flows along with the QoS behavior to be enforced, such as QoS class indicator, maximum bit rate (MBR), aggregate MBR (AMBR), etc. In some instances, the PCRF 155 may determine the charging and QoS rules based upon the subscription information associated with user equipment 120 and stored in the SPR 205.

The PCEF 210 may be configured to enforce policy decisions received from PCRF 155 and also to provide the PCRF 155 with user equipment 120 and access specific information.

The BBERF 215 may be configured to perform the function of applying the QoS rules to service data flows in the access network and binding of the IP flows to access bearers in the bearer-plane.

The AF 220 may be configured to interact or intervene with applications that require dynamic policy and charging control. For example, the AF 220 may extract session information and provide the session information to the PCRF 155. The AF 220 may thus perform a call server control function (CSCF) 165 in the PCC architecture 200.

The PCRF 155 is a central entity in the PCC architecture 200 and may be configured to make policy and charging control decisions. These decisions of the PCRF 155 may be based on input from one or more of sources, including: operator configuration in the PCRF 155 that defines the policies or SLA to given services; subscription information for a given user received from the SPR 205; information about the service received from the AF 220 or proxy-CSCF (P-CSCF) 165 in the IMS 145; and information from the access network including what access technology is being used.

How, when, and what triggers the PCRF 155 to perform a policy action may depend on network usage information received from the one or more sources in the network, as well as the QoS rules configured to identify the data flows and subscription information associated with the user equipment 120 stored in the SPR 205 and/or HSS 160. In some instances, the QoS rules may include certain values or thresholds for key variables that are measured by the sources of information in the network.

If the PCRF 155 determines that an identified user, traffic flow, application or user equipment 120 device exceeds a threshold value of one or more of these key variables set by the QoS rules, the PCRF 155 may direct the network to perform one or more policy actions. These policy actions may serve to remedy the issue with the non-compliant user, application and/or flow. As some examples, the PCRF 155 may make the decision to drop a connection that violates a policy or QoS rule, delay the connection, or downgrade the connection. In some instances, the PCRF 155 may decide to use multiple policy actions in combination, such as delaying and downgrading the connection. In other instances, the PCRF 155 may decide to ignore the non-compliant connection or otherwise not perform any policy action.

These policy decisions made by the PCRF 155 can only be made based on the network usage information available to the PCRF 155 through its one or more sources. Accordingly, additional information regarding key parameters within the network may improve decision-making ability of the PCRF 155.

Figure 3:
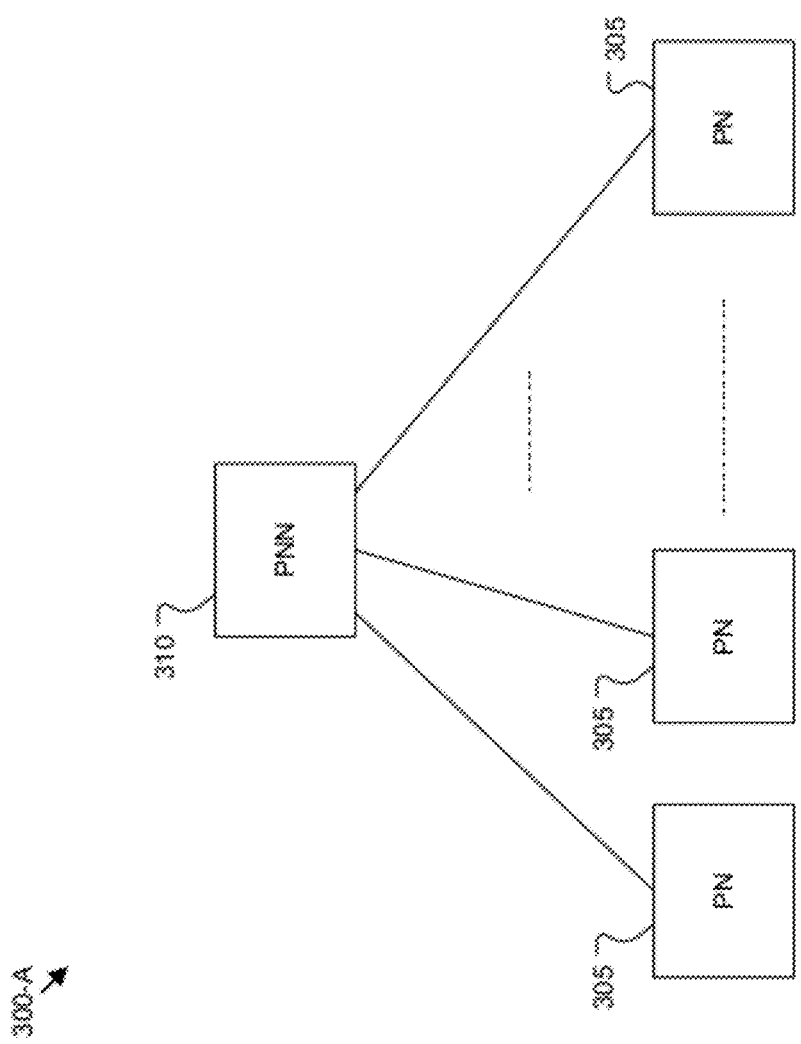
FIG. 3 illustrates an exemplary architecture for a network traffic policing system.

FIG. 3 illustrates an exemplary network traffic policing system (NTPS) 300-A. The NTPS 300-A may be configured to monitor key traffic characteristics on the network, and provide the network with additional tools to determine whether usage of a user, application, or traffic flow is network compliant. The NTPS 300-A may have a hierarchical architecture, including one or more policy nodes (PN) 305, and a policy network node (PNN) 310. The PNs 305 of the NTPS 300-A may be configured to monitor and gather statistics on key variables, and to send updated information regarding the key variables to an associated PNN 310. The PNN 310 of the NTPS 300-A may in turn be configured to process the updated information received from the PNs 305 and to recommend one or more policy actions to the PNs 305 to be performed.

The PNs 305 may be configured to monitor and gather statistics on key variables. The PNs 305 may be associated with and/or located at various locations throughout the wireless network systems. Having PNs 305 in various locations throughout the network allows the PNs 305 to monitor and gather information on different key variables as well as to determine and send statistics regarding different portions of the network. As an example, PNs 305 may be included or otherwise associated with eNBs nodes 115 in an LTE 110 radio access network to monitor air interface usage and connection requests on the LTE 110 network. As some other examples, PNs 305 may be included or otherwise associated with MME 130, SGW 135 and PGW 140 nodes in the EPC 125 to monitor data usage and activity in the core network.

Exemplary key variables that the PNs 305 may be configured to monitor may include: dormancy time at eNB nodes 115; data session time; average packet interval time; inactivity time between messages in instant messaging (IM) and presence services; data rate: average bit rate, maximum bit rate (MBR) and aggregate maximum bit rate (AMBR); total data usage; number of active data sessions; number of messages at eNB nodes 115 and MME 130; and number of connection requests.

The PNs 305 may further be configured to send updated information on the key variables to an associated PNN 310. The PNNs 310 may be configured to receive and process the information from the PNs 305. The PNNs 310 may further be configured to maintain or have access to information regarding the allowed values or thresholds of statistics provided by PNs 305. In some instances, the PNN 310 may be located or otherwise implemented as a part of the PCRF 155 of the IMS 145 network, to facilitate incorporation with existing policy decision functionality of the network. By working in combination with the PCRF 155 policy engine and policy decision functionality, the PNN 310 may be configured to recommend one or more policy actions. Exemplary policy actions that may be recommended by the PNN 310 may include reject, delay, and downgrade policy actions, to give some examples.

Exemplary key parameter thresholds may include thresholds such as: maximum dormancy time; number of violations in dormancy time; maximum data session time; number of violations in data session time; maximum average packet interval time; number of violations in average packet arrival time; maximum inactivity time between messages in instant messaging (IM) and presence services; number of violations in maximum inactivity time; data rate: maximum bit rate (MBR) and aggregate maximum bit rate (AMBR); number of violations in MBR and AMBR; total data usage; number of violations in total data usage; maximum for number of active data sessions; maximum for number of messages at eNB nodes 115 and MME 130; and maximum for number of connection requests.

Figure 4:
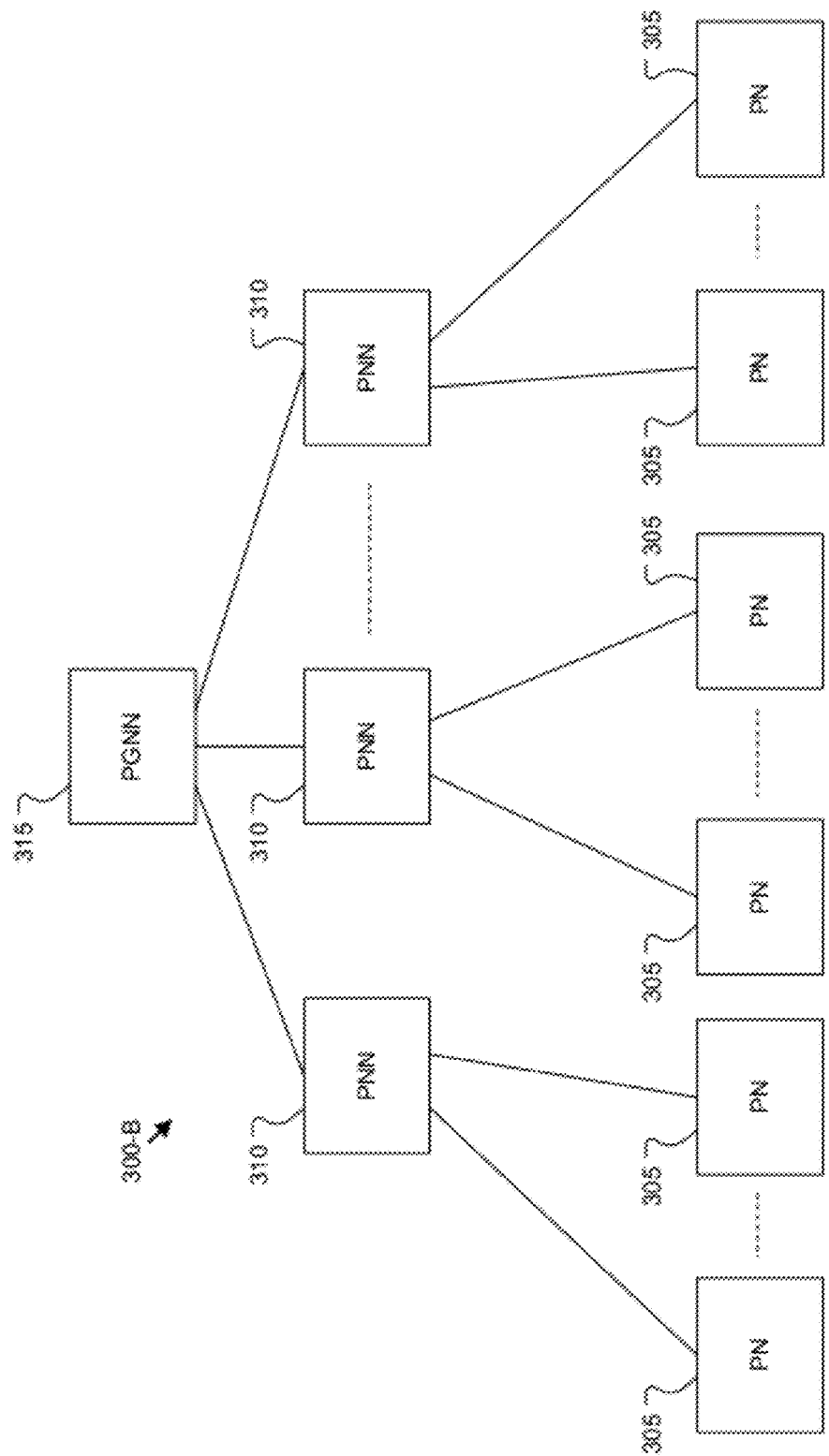
FIG. 4 illustrates an exemplary architecture for a network traffic policing system supporting large networks.

FIG. 4 illustrates an exemplary NTPS 300-B configured for supporting a larger network. In a larger network connecting multiple local networks, a single PNN 310 may be insufficient. Accordingly, the NTPS 300-B can be extended to cover a larger network connecting multiple local networks. This can be facilitated by including a PGNN 315 in the NTPS 300, in combination with multiple PNNs 310. As shown in FIG. 4, the NTPS 300-B may have a hierarchical structure, including one or more PNs 305 each connected to one of one or more PNNs 310, with each of the PNNs 310 in turn connected to a PGNN 315.

Similar to as discussed above with respect to the NTPS 300-A, the PNs 305 in the NTPS 300-B may be configured to monitor key variables and to send updated information on the key variables to an associated PNN 310.

In larger networks, however, the PNNs 310 may be configured to route the updated information on the key variables to the PGNN 315, rather than recommending one or more policy actions directly. The PNNs 310 in the larger network may still maintain or have access to the information on allowable values and key variable thresholds used to make the policy decisions, and may also forward this information onto the PGNN 315 to facilitate the PGNN 315 in determining a globally-appropriate policy action. In some examples, the PNNs 310 may compile statistics from the updated information received from the PNs 305, and may provide the compiled statistics to the PGNN 315 rather than the updated information from the PNs 305. This intermediate data processing may be performed both to reduce the amount of data to be sent to the PGNN 315, and also to ease the computational burden on the PGNN 315.

The PGNN 315 may receive the updated information or compiled statistics from the PNs 305 via the PNNs 310. After receiving the updated information or compiled statistics from the PNNs 310, the PGNN 315 may further be configured to process the information and determine any policy-appropriate policy actions. The PGNN 315 may further be configured to enforce the determined policy action in conjunction with one or more PCRFs 155 in one or more IMS 145 networks. Similar to as discussed above with respect to the PNNs 310, the PGNN 315 may be located or otherwise implemented as a part of a PCRF 155 to facilitate incorporation with existing policy decision functionality of the network. In some examples, the PGNN 315 may simply be a PNN 310 designated by the NTPS 300 to perform the role of PGNN 315.

The NTPS 300 can be even further extended, and multiple PGNNs 315 may be deployed and interconnected in a network. Accordingly, multiple PGNNs 315 may be utilized to facilitate network-aware decision-making in even the largest of networks.

As mentioned above, the PNs 305, PNNs 310 and PGNNs 315 may be implemented at various network nodes in LTE 110/EPC 125 networks, such as one or more of the eNB 115, MME 130, SGW 135, PGW 140, and PCRF 155 network nodes. In some examples, the PNs 305, PNNs 310 and PGNNs 315 may be implemented as software executed by the various network nodes, thereby allowing for the NTPS 300 hierarchy to be implemented without requiring substantial hardware changes to the underlying networks.

Figure 5:
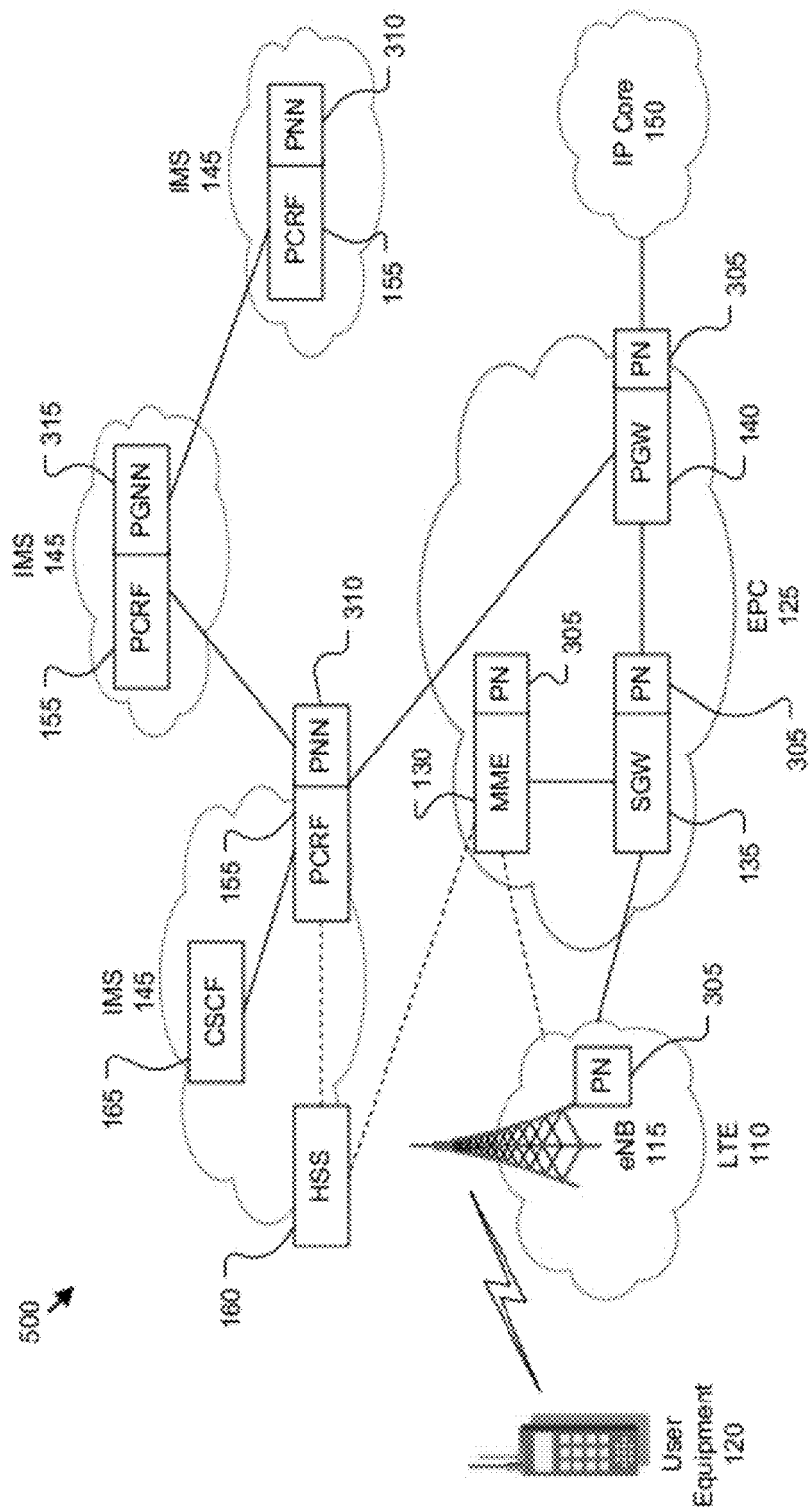
FIG. 5 illustrates an exemplary deployment of a network traffic policing system in a wireless network.

FIG. 5 illustrates an exemplary deployment of an NTPS 300 in a wireless network. As shown in the figure, PNs 305 may be implemented in association with an eNB 115 in an LTE 110, and in association with MME 130, SGW 135, and PGW 140 nodes in an EPC 125. Accordingly, the PNs 305 may be configured to monitor statistics on key variables of the wireless LTE 110 network and of the EPC 125 packet core. PNNs 310 may be deployed in PCRFs 155 in various IMS networks 145 in communication with the PNs 305. A PGNN 315 may be further implemented on one of the IMS network 145 in association with a PCRF 155, and may also be in communication with the PNNs 310.

The PNs 305 may send updated information on the key variables to the PNNs 310. For example, the PNs 305 associated with nodes 115 in the LTE 110 may send updated information regarding air interface utilization. As another example, the PNs 305 associated with nodes of the EPC 125 may send updated information regarding flows on the packet core. The PNNs 310 may in turn compile statistics from the updated information received from the PNs 305, and may send the compiled information to the PGNN 315. The PGNN 315 may compare the received statistics for a user, application, or flow with QoS rules, resource allocations, or other key variable thresholds. For example, these resource allocations or key variable thresholds may be determined based on information stored in the SPR 205 and/or HSS 160, such as QoS rules configured to identify the data flows and subscription information associated with the user equipment 120.

Based on these comparisons, the PGNN 315 may determine any policy actions that should be performed. The PGNN 315 may make the determination of a policy action alone, or in combination with one or more PCRFs 155. As some examples, the PGNN 315 and/or PCRF 155 may make the decision to perform policy actions such as dropping, delaying, or downgrading a connection. In some instances, the PGNN 315 and/or PCRF 155 may decide to use multiple policy actions in combination, such as delaying and then downgrading the connection. In other instances, the PGNN 315 and/or PCRF 155 may decide to ignore the non-compliant connection or otherwise not perform any policy action.

Any determined policy actions may be forwarded from the PGNN 315 to the PNNs 310, and finally to the PNs 305. The PNs 305 may then apply the received policy action to the user, application, or flow. Accordingly, the NTPS 300 may be used to implement policy actions on the network to suit the needs and service requirements of the network.

Figure 6:
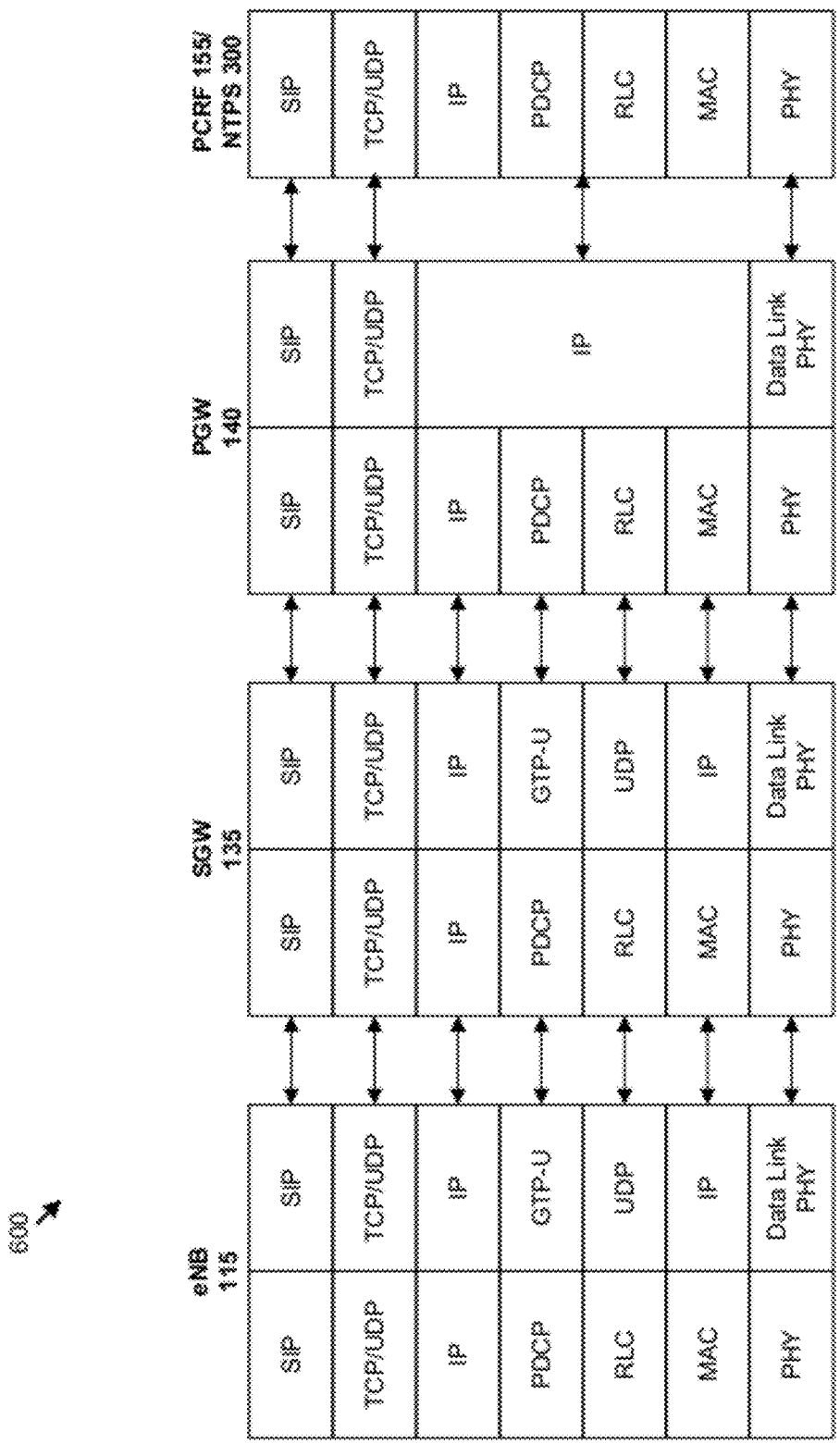
FIG. 6 illustrates an exemplary diagram for network traffic policing system protocol stacks.

FIG. 6 illustrates an exemplary diagram 600 for NTPS 300 protocol stacks. As shown, FIG. 6 utilizes the SIP protocol for carrying NTPS 300 messages. One reason for utilization of the SIP protocol in the illustrated exemplary network stacks is that PNNs 310 and PGNNs 315 may be implemented in PCRF 155/IMS 145, and SIP is a potential protocol choice for use in the IMS networks 145. Nevertheless, in other implementations, protocols other than SIP may be utilized for communication in the NTPS 300 among the PN 305, PNN 310, and PGNN 315 network nodes.

The variables that are considered most relevant, and the values or thresholds used to determine when to enforce a policy action depend upon the needs of the users or service providers. These values may also depend on application types and user profile information. As an example, some users pay more to use more bandwidth, and this information may be reflected in the profile information for these users stored by the SPR 205 and/or HSS 160.

In some examples, key variable threshold parameters may be determined by the service provider based on average statistics for the network. Based on the average statistics, a service provider may determine appropriate threshold values to include in the QoS rules.

With respect to voice data flows, average statistics may be collected such as seconds of average call hold time or call duration; number of busy hour call attempts (BHCA); and bytes of an average VoIP packet size. With respect to data flows, average statistics may be determined for average downlink and uplink data rate; data download to upload ratios; and average data packet size (e.g., bytes).

Using these average values, service provider may determine appropriate threshold values. For example, threshold values may be determined for call attempts during busy hour; call attempts per day; authentication, authorization, and accounting requests per day; average IP packet size; packet rate per call download and upload traffic maximums, total packet rate per call including both download and upload traffic; data volume per call download and upload traffic maximums; total data volume per call including both download and upload traffic; data volume per busy hour download and upload traffic maximums; total data volume per busy hour including both download and upload traffic; data volume per month download and upload traffic maximums, and total data volume per month hour including both download and upload traffic.

Moreover, thresholds may further be defined per-application. For example, for an instant messaging application or a presence application, threshold values may be set for average packet inter-arrival time; average packet size; and/or throughput.

As a more specific example, QoS rules for a network defined by an SLA may include three quality of service (QoS) levels: a "gold" service level class, a "silver" service level class, and a "bronze" service level class. Resources of the network such as bandwidth may be assigned to the service levels as well as network priorities. For instance, users, applications, or flows associated with the "gold" service class may be given strict priority status for up to a set amount of bandwidth, thereby providing low loss, jitter, and delay for these flows. The remainder of the network resources may be divided between the "silver" and "bronze" service classes, with users, applications, or flows associated with the "silver" service class taking priority over users, applications, or flows associated with the "bronze" service class.

Based on input from one or more of sources, the NTPS 300 may determine that an identified application flow in the "gold" class violated its agreed-to QoS rules. The identified application flow may have consumed too much air interface time on the LTE 110 compared to its bandwidth usage, or may have exceeded an allocation of bandwidth specified by the subscription information associated with the user equipment 120. Accordingly, the NTPS 300 may determine one or more policy actions to be performed on the non-compliant flow.

Since the flow belongs to "gold" class, the NTPS 300 may elect to take no action, if, for example, there are still adequate network resources available for the "gold" class.

As another possibility, even if adequate network resources are still available, the NTPS 300 may still elect to perform a policy action, as the application flow violated the conditions of the SLA. For example, the NTPS 300 may down-grade the flow from "gold" class to the "silver" class or even to the "bronze" class, provided that network resources are available in the "silver" or "bronze" class. This would accordingly allow the offending application flow to continue at a lower priority, while allowing other "gold" services to make use of the preferential treatment of the "gold" service class.

If adequate network resources are not available in the "gold" class, the NTPS 300 may elect to downgrade the flow to the "silver" class, downgrade the flow to the "bronze" class, or simply drop the offending flow. Or, if the NTPS 300 determines that there are no resources available in the "silver" or "bronze" classes, the NTPS 300 may also elect to drop the flow.

Dropping an application flow may be a good option for services that may not handle a degradation of service such as a real-time voice stream application flow. On the other hand, if the application flow is for a non-real-time service, such as a file transfer, e-mail, or web browsing, a delay policy action to shape the traffic may be appropriate, with transmission or dropping of the application flow being determined and applied after the delay. These may be considered combinations of policy actions; that is, delay/transmit or delay/drop.

More generally, real-time applications such as voice cannot tolerate delay, so the appropriate policy actions may include either downgrade or drop, but not delay. Some data applications, like file transfer, can tolerate delay but are especially penalized by being dropped. Accordingly for such applications, delay and downgrade policy actions may be appropriate to attempt to minimize the loss of information, with drop only being used as a last resort.

Accordingly, system operators or service providers may use the NTPS 300 to implement policy actions on a network to suit their needs and service requirements with respect to next-generation networks. The NTPS 300 may use the additional information received from the PNs 305 to address issues that result from use cases other than the utilization of excessive bandwidth. For example, the NTPS 300 may allow the system operator to address network issues with low-bandwidth instant messaging and presence services that can cause significant radio resource utilization problems, as well applications and malfunctioned user devices that continuously attempt to attach or disconnect and reattach to the networks.

The NTPS 300 accordingly benefits to a service provider, by allowing for policing of additional key variables of network resource usage. By preventing excessive usage of network resources from applications and users, such as by presence services that cause radio resource utilization problems, the service providers can experience cost savings in the network. In particular, wireless operators may use key variable thresholds to limit user, application, or flow usage of scarce and expensive radio access resources. Ill-behaved users, faulty applications, malfunctioned devices, and even a few heavy users can create congestion or network outages. By detecting such users and applications, and by performing policy actions on them, service providers can provide better quality services for all.

Figure 7:
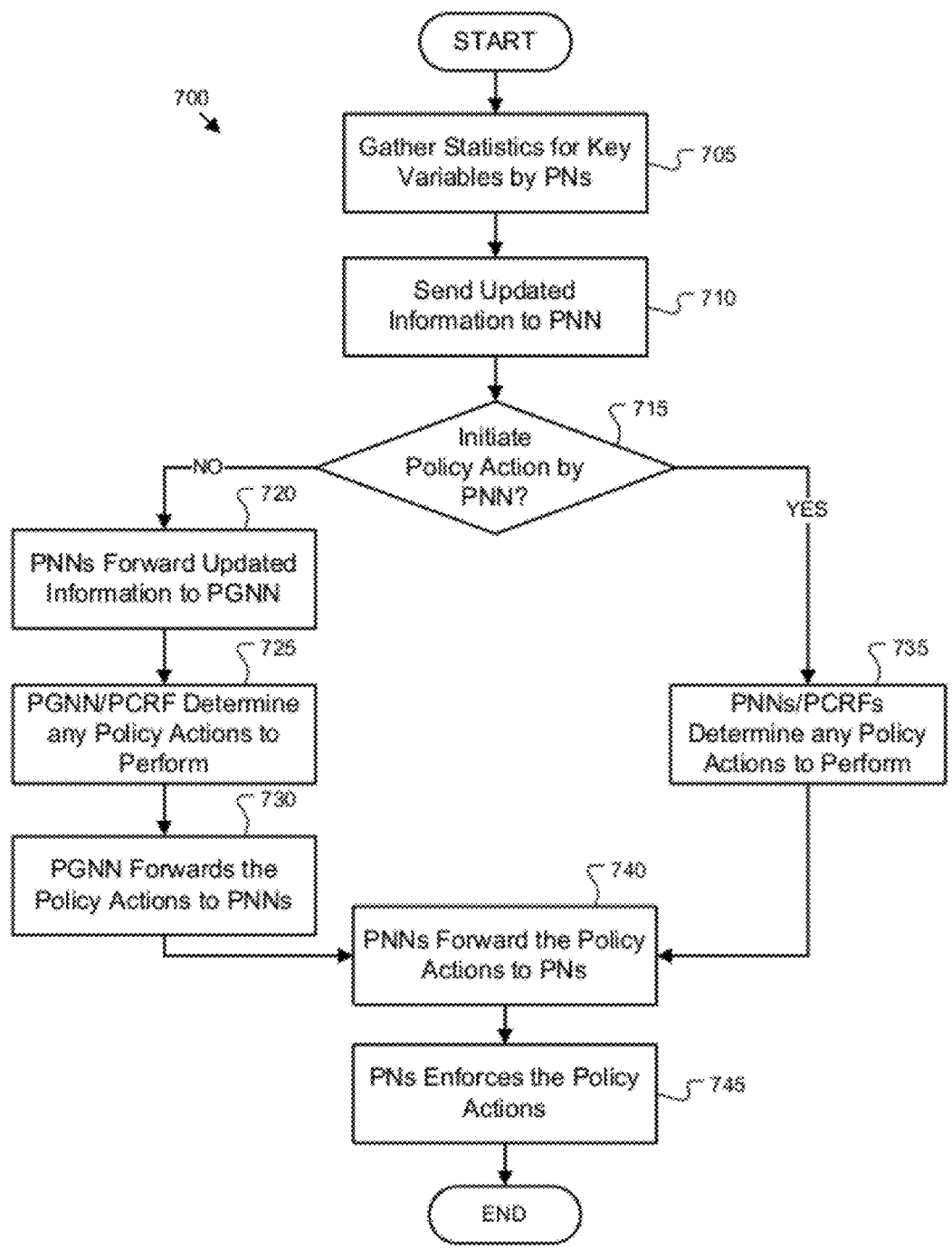
FIG. 7 illustrates an exemplary process flow for an network traffic policing system.

FIG. 7 illustrates an exemplary process flow 700 for an NTPS 300. The process 700 may be implemented by various systems, such as by the exemplary deployment of a hierarchical NTPS 300 in a wireless network as illustrated in FIG. 5.

In block 705, the PNs 210 gather statistics for key variables. For example, PNs 305 may be implemented or deployed in eNB 115, MME 130, SGW 135, and PGW 140 to monitor key variables of the network. Exemplary monitored variables may include: dormancy time at eNB nodes 115; data session time; average packet interval time; inactivity time between messages in instant messaging (IM) and presence services; data rate: average bit rate, maximum bit rate (MBR) and aggregate maximum bit rate (AMBR); total data usage; number of active data sessions; number of messages at eNB nodes 115 and MME 130; and number of connection requests, among other exemplary variables.

In block 710, the PNs 305 send updated information to a PNN 310. For example, each PNs 305 may send the gathered variable information to its associated PNN 310 in the NTPS 300 hierarchy, using NTPS 300 messaging over SIP. In some instances, the associated PNN 310 is implemented in combination with a PCRF 155.

In decision point 715, the PNN 310 determines whether to initiate a policy action. For example, if the PNN 310 is associated with a PGNN 315 in the NTPS 300 hierarchy, then the PNN 310 may determine that it is subordinate and should not initiate a policy action. If the PNN 310 is not associated with a PGNN 315 in the NTPS hierarchy 300, then the PNN 310 may determine that it is responsible for making policy determinations. The PNN 310 may be responsible for making policy determinations if the PNN 310 is included in a smaller network with only a single PNN 310, or if the network is a larger network and the PNN 310 is promoted or otherwise assigned the role of PGNN 315. If the PNN 310 determines it should not initiate a policy action, control passes to block 720. Otherwise, control passes to block 735.

In block 720, the PNN 310 forwards updated information to the PGNN 315. In some instances, the PNNs 310 may be configured to compile statistics from the information received from the PNs 305. This compiled information may be send to the PGNN 315 rather than as raw information, to reduce the amount of data to be sent to the PGNN 315, and also to ease the computational burden on the PGNN 315.

In block 725, the PGNN 315 determines any policy actions to be performed in response to a policy decision. A policy decision may be determined alone, or in combination with an associated PCRF 155. For example, the PCRF 155 may identify traffic flows, resource allocations, and key parameter thresholds based on information stored in the SPR 205 and/or HSS 160, including QoS rules configured to identify the data flows and subscription information associated with the user equipment 120. Based on the identifications, the PGNN 315 and/or PCRF 155 may make the decision to perform policy actions such as dropping, delaying, or downgrading a connection. In some instances, the PGNN 315 and/or PCRF 155 may decide to use multiple policy actions in combination, such as delaying and then downgrading the connection. In other instances, the PGNN 315 and/or PCRF 155 may decide to ignore the non-compliant connection or otherwise not perform any policy action.

In block 730, the PGNN 315 forwards any determined policy actions to the PNNs 310. For example, the PGNN 315 may send the determined policy actions to its associated PNNs 310 using NTPS 300 messaging over SIP.

In block 735, the PNN 310 determines any policy actions to be performed. These policy decision may be determined alone, or in combination with an associated PCRF 155. Exemplary policy decisions determined by the PNN 310 may be similar to those discussed above with respect to the PGNN 315 described with respect to block 725.

In block 740, the PNNs 310 forward any determined policy actions to the PNs 305. For example, the PNNs 310 may send the determined policy actions to its associated PNs 305 using NTPS 300 messaging over SIP.

In block 745, the PNs 305 enforce the policy action. For example, the PNs may delay, downgrade, or drop the indicated users, applications, or application flows. Next, the process 700 ends.

In general, computing systems and/or devices, such as user equipment 120, eNB 115, MME 130, SGW 135, PGW 140, PCRF 155, HSS 160, and CSCH 165 may employ any of a number computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as HSS 160 and SPR 205, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that disclosed systems and methods are capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
    a network traffic policing system configured to monitor resource intensive users and applications of a wireless communication network, the network traffic policing system including:
    a processing device implemented as part of a policy and charging rule function of the wireless communication network and configured to determine policy actions; and
    a plurality of policy nodes in communication with the processing device and configured to:
        gather statistics regarding key variables of the wireless communication network, the statistics including at least one key variable indicative of a non-data usage measure of network resource utilization,
        forward updated information relating to the key variables to the processing device to cause the processing device to determine at least one policy action in combination with policy decision functionality of the policy and charging rule function, and
        enforce the at least one policy action determined by the processing device.

2. The system of claim 1, wherein the at least one policy action includes at least one of a drop, delay, or downgrade policy action.

3. The system of claim 1, wherein the processing device is further configured to determine at least one policy action to perform on a traffic flow based on a key parameter threshold and the updated information.

4. The system of claim 3, wherein the processing device is further configured to identify the traffic flow based in part on rules retrieved from a subscription profile repository.

5. The system of claim 3, wherein the processing device is further configured to determine the key parameter threshold based at least in part on subscription information associated with a user equipment device.

6. The system of claim 3, wherein the key parameter threshold is at least one of: a maximum dormancy time; a number of violations in dormancy time; a maximum data session time; a number of violations in data session time; a maximum average packet interval time; a number of violations in average packet arrival time; a maximum inactivity time between messages in instant messaging and presence services; a number of violations in maximum inactivity time; a data rate including one of a maximum bit rate and an aggregate maximum bit rate; a number of violations in maximum bit rate and aggregate maximum bit rate; a total data usage; a number of violations in total data usage; a maximum for number of active data sessions; a maximum for number of messages at least one of a long term evolution network node and a mobility management entity; and a maximum number of connection requests.

7. The system of claim 1, wherein the plurality of policy nodes are implemented on at least one of a long term evolution network node, a mobility management entity, a serving gateway, and a packet data network gateway of the wireless communication network.

8. The system of claim 1, wherein the processing device is a policy network node configured to:
    determine the at least one policy action to perform based on the updated information; and
    provide the least one policy action to at least a subset of the plurality of policy nodes to be enforced.

9. The system of claim 1, wherein the key variables include at least one of: dormancy time at a long term evolution network node, data session time, average packet interval time, inactivity time between messages in instant messaging and presence services, average bit rate, maximum bit rate, aggregate maximum bit rate, number of active data sessions, number of messages at the long term evolution network node, number of messages at the mobility management entity, and number of connection requests.

10. The system of claim 1, further comprising:
    a policy network node configured to:
        gather updated information from a subset of the plurality of policy nodes,
        compile the updated information from the subset of the plurality of policy nodes into statistics, and
        route the compiled statistics to the processing device.

11. A system, comprising:
    a network traffic policing system configured to monitor resource intensive users and applications of a wireless communication network, the network traffic policing system including:
    a processing device configured to determine policy actions; and
    a plurality of policy nodes in communication with the processing device and configured to:
        gather statistics regarding key variables of the wireless communication network, the statistics including at least one non-data usage variable,
        forward updated information relating to the key variables to the processing device, and
        enforce at least one policy action determined by the processing device;
    a policy network node configured to:
        gather updated information from a subset of the plurality of policy nodes,
        compile the updated information from the subset of the plurality of policy nodes into statistics from the policy network node, and
        route the compiled statistics from the policy network node to the processing device; and
    an additional policy network node configured to:
        gather updated information from a second subset of the plurality of policy nodes,
        compile the updated information from the second subset of the plurality of policy nodes into statistics from the additional policy network node, and
        route the compiled statistics from the additional policy network node to the processing device;
    wherein the processing device is a policy global network node configured to:
        receive the compiled statistics from the policy network node;

receive the compiled statistics from the additional policy network node; and
determine at least one policy action to perform based on the compiled statistics received from the policy network node and from the additional policy network node.

12. The system of claim 11, wherein the policy global network node is further configured to send the least one policy action to the plurality of policy nodes by way of at least one of the policy network node and the additional policy network node.

13. A method, comprising:
gathering, by a plurality of policy nodes, statistics for key variables of a wireless communications network, the statistics including information regarding at least one key variable indicative of a non-data usage measure of network resource utilization;
forwarding updated information regarding the statistics to a processing device node of a network traffic policing system;
determining at least one policy action to perform by the processing device node based on the updated information and in combination with a policy and charging rule function node of the wireless communications network;
forwarding the determined at least one policy action to at least a subset of the plurality of policy nodes; and
enforcing the policy action received from the processing device by the policy nodes.

14. The method of claim 13, further comprising measuring statistics of at least one of a radio access node, a mobility management entity, a serving gateway, and a packet data network gateway of the wireless communications network.

15. The method of claim 13, further comprising:
forwarding the updated information from a subset of the plurality of policy nodes to a policy network node;
compiling statistics from the updated information by the policy network node; and
forwarding the compiled statistics to the processing device.

16. A non-transitory computer-readable medium tangibly embodying computer-executable instructions configured to cause a processor of a policy and charging rule function computing device to:
receive statistics for key variables from a plurality of policy nodes, the statistics including information regarding at least one key variable indicative of a non-data usage measure of network resource utilization, the policy nodes being configured to gather statistics from at least one of a radio access node, a mobility management entity, a serving gateway, and a packet data network gateway of a wireless communications network;
determine at least one policy action to perform based on the received statistics in combination with policy decision functionality of the policy and charging rule function; and
forward the determined at least one policy action to at least a subset of the plurality of policy nodes, thereby causing the at least a subset of plurality of policy nodes to enforce the determined at least one policy action.

17. The computer-readable medium of claim 16, wherein the statistics for key variables include at least one of: air interface usage and connection requests on a radio portion of the wireless communications network and data usage and activity on a packet core of the wireless communications network.

18. The computer-readable medium of claim 16, wherein the at least one policy action includes at least one of a drop, delay, or downgrade policy action.

\* \* \* \* \*